United States Patent
Haas et al.

(10) Patent No.: US 8,845,245 B2
(45) Date of Patent: Sep. 30, 2014

(54) DAMPENED SPINDLE CARTRIDGE AND SPINDLE ADAPTOR

(75) Inventors: Gene F. Haas, Camarillo, CA (US); Fred G. Eubanks, Oxnard, CA (US); Peter A. Kiss, Santa Clarita, CA (US); Curt J. Gelderman, Newbury Park, CA (US)

(73) Assignee: Haas Automation, Inc., Oxnard, CA (US)

( * ) Notice: Subject to any disclaimer, the term of this patent is extended or adjusted under 35 U.S.C. 154(b) by 968 days.

(21) Appl. No.: 12/878,009

(22) Filed: Sep. 8, 2010

(65) Prior Publication Data

US 2011/0070043 A1    Mar. 24, 2011

Related U.S. Application Data

(60) Provisional application No. 61/240,631, filed on Sep. 8, 2009.

(51) Int. Cl.
*B23C 1/02* (2006.01)
*B23Q 1/70* (2006.01)
*B23Q 11/00* (2006.01)

(52) U.S. Cl.
CPC .............. *B23Q 1/70* (2013.01); *B23Q 11/0032* (2013.01)
USPC .......................................... 409/141; 409/231

(58) Field of Classification Search
CPC ........... B23Q 11/0032; B23Q 11/0035; B23Q 11/0039
USPC .................................................. 409/141, 231
See application file for complete search history.

(56) References Cited

U.S. PATENT DOCUMENTS

| | | | |
|---|---|---|---|
| 3,378,115 A * | 4/1968 | Stephens, III | 188/218 A |
| 3,747,470 A * | 7/1973 | Inoue et al. | 409/141 |
| 4,560,289 A | 12/1985 | Wood, III | |
| 4,836,723 A * | 6/1989 | Flammini | 409/141 |
| 5,769,579 A * | 6/1998 | Stutsman | 409/203 |
| 6,357,565 B1 | 3/2002 | Bolledi et al. | |
| 7,329,048 B2 | 2/2008 | Klusman et al. | |
| 2003/0147712 A1* | 8/2003 | Kai et al. | 409/141 |
| 2004/0234351 A1* | 11/2004 | Mazza' | 409/141 |
| 2008/0001367 A1* | 1/2008 | Retzbach | 279/140 |

FOREIGN PATENT DOCUMENTS

| | | | | |
|---|---|---|---|---|
| JP | 03221303 A * | 9/1991 | | B23B 29/02 |
| JP | 05277806 A * | 10/1993 | | B23B 19/02 |

* cited by examiner

*Primary Examiner* — Daniel Howell
*Assistant Examiner* — Michael Vitale
(74) *Attorney, Agent, or Firm* — McDermott Will & Emery LLP (57) ABSTRACT

A dampened spindle cartridge and a dampened spindle adaptor are provided for damping tool vibrations during operation of a machine tool. Damping media is arranged inside a cavity formed within the spindle adaptor or the spindle cartridge. The damping media may be a solid aggregate, such as steel shot or sand, or a viscous fluid, such as oil. The damping media attenuates and/or converts tool vibrations into friction and heat, thereby dissipating vibration energy generated during cutting operations performed by the machine tool and prevents reinforcement of the forced vibration.

26 Claims, 8 Drawing Sheets

DAMPENED SPINDLE CARTRIDGE AND SPINDLE ADAPTOR

This application claims the benefit of U.S. Provisional Application No. 61/240,631, filed on Sep. 8, 2009, which is hereby incorporated by reference herein.

BACKGROUND

The subject technology is directed to machine tools and, in particular, is directed to machine tool spindle cartridges and spindle adaptors for dampening cutting tool vibrations.

Machine tools use a variety of cutting tools to shape and finish a work piece into a desired form. A cutting tool is mounted to a machine tool spindle which is rotated and fed into a work piece to remove material from the work piece using the cutting tool. In order to maximize the utilization of the machine tool, the spindle and mounted cutting tool are often rotated at high speeds in order to remove material from the work piece at the quickest rate possible. As the rotational speed and/or feed rate of the spindle and cutting tool is increased, tool vibration often develops resulting in poor surface finish on the work piece, reduced tool life and objectionable noise.

SUMMARY

The subject technology provides a media dampened spindle adaptor and a media dampened spindle cartridge for dampening tool vibrations during operation of a machine tool. The dampening media is arranged inside a cavity formed within the structure of a spindle head of a machine tool or within a spindle cartridge mounted in a spindle headstock of a machine tool. The damping media may be a viscous fluid, such as a heavy gear oil (e.g., Alpha SP 320 gear oil), a solid aggregate, such as sand or steel shot (e.g., 0.023" to 0.033"), or a combination of a solid aggregate and an oil, such as a medium weight oil. The damping media is used to convert radial motion of the tool vibration into friction and heat, thereby dissipating the vibration energy of the cutting tool and preventing reinforcement of the forced vibration.

According to one aspect of the subject technology, a dampened spindle cartridge for a machine tool is provided. The dampened spindle cartridge includes an outer body having a flange configured to be attached to a spindle head of the machine tool and an inner body configured to house a rotating spindle assembly, wherein the inner body is coaxially arranged within the outer body. The dampened spindle cartridge further includes damping media arranged in a cavity formed between the outer body and the inner body, a retaining ring positioned in an opening of the cavity, and a cap attached to a proximal end of the outer body and a proximal end of the inner body to limit radial movement of the proximal end of the inner body relative to the proximal end of the outer body and axial movement of the inner body relative to the outer body. The cap covers the opening of the cavity and presses the retaining ring against the damping media to limit movement of the damping media within the cavity.

According to another aspect of the subject technology, a dampened spindle cartridge for a machine tool is provided. The dampened spindle cartridge includes an outer body having a flange configured to be attached to a spindle head of the machine tool and an inner body configured to house a rotating spindle assembly, wherein the inner body is coaxially arranged within the outer body. The dampened spindle cartridge further includes a first seal arranged between the outer body and the inner body, a second seal arranged between the outer body and the inner body, and damping fluid filling a clearance between the inner body and the outer body and between the first seal and the second seal. A cap covers a proximal end of the outer body and is attached to a proximal end of the inner body to limit axial movement of the outer body relative to the inner body.

According to another aspect of the subject technology, a dampened spindle adaptor is provided. The dampened spindle adaptor includes an adaptor bushing arranged within a bore of a spindle head and attached to the spindle head at a proximal end of the adaptor bushing, wherein the adaptor bushing is configured to house a spindle cartridge. The dampened spindle adaptor further includes damping media arranged in a cavity formed between the adaptor bushing and the spindle head and a compression plate arranged in the cavity and configured to apply pressure on the damping media in the cavity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
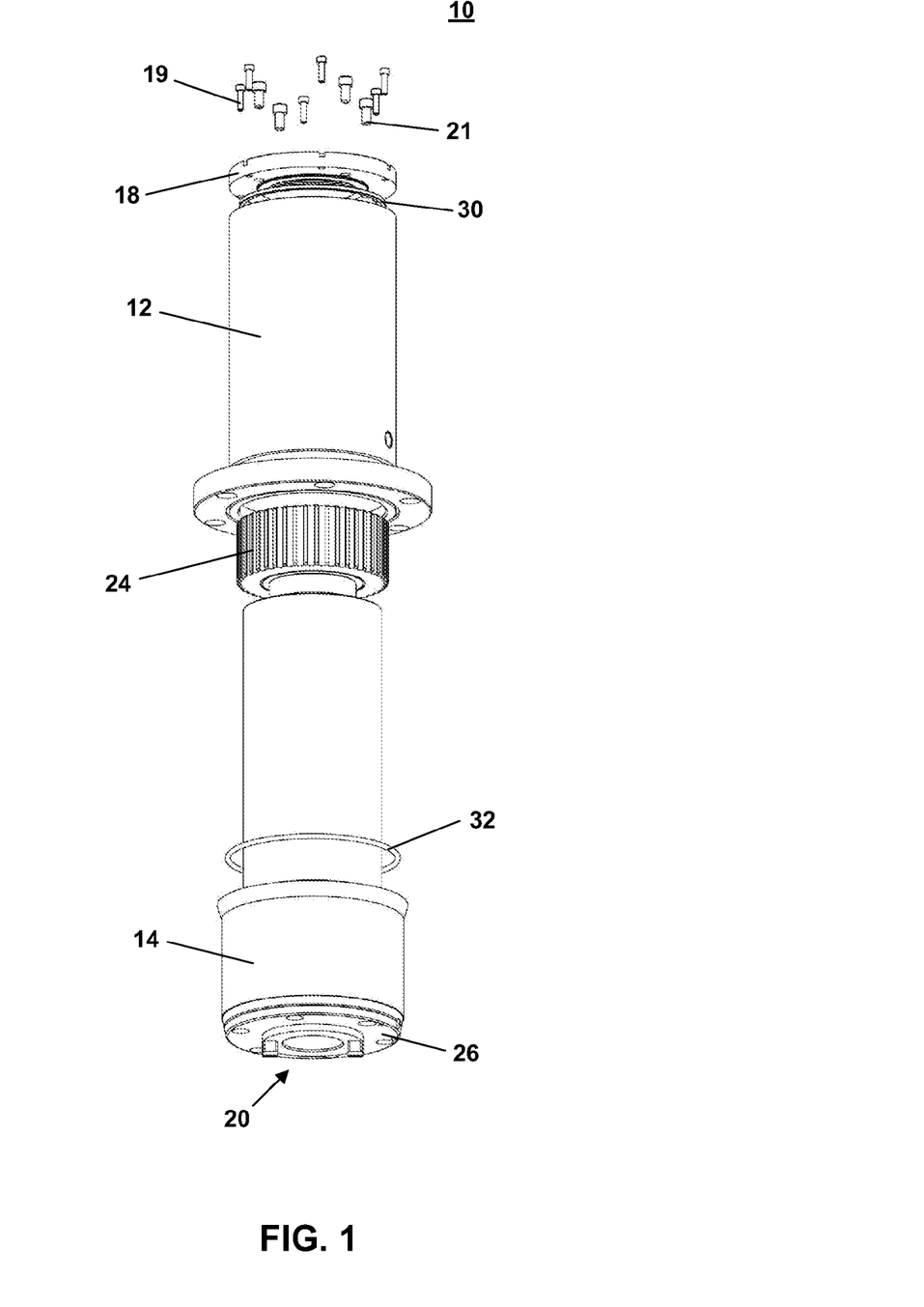
FIG. 1 is a perspective view of components of a partially disassembled dampened spindle cartridge according to one aspect of the subject technology.
Figure 2:
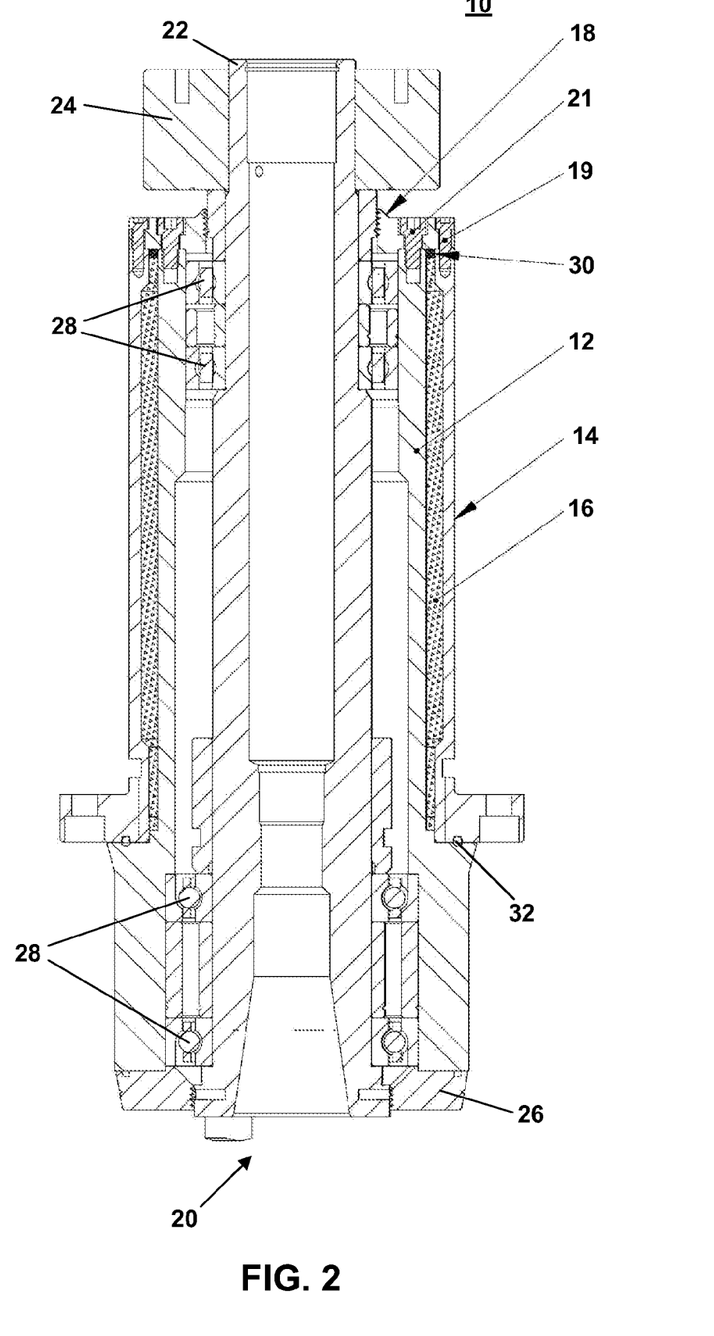
FIG. 2 is a cross-sectional view of a dampened spindle cartridge according to one aspect of the subject technology.

FIG. 1 is a perspective view of components of a partially disassembled dampened spindle cartridge according to one aspect of the subject technology. FIG. 2 is a cross-sectional view of the dampened spindle cartridge according to one aspect of the subject technology. The spindle cartridge 10 includes a cylindrical outer body 12 and a cylindrical inner body 14. The inner body 14 is coaxially arranged within the outer body 12 with a cavity 16 formed between the inner body 14 and the outer body 12, as shown in FIG. 2. The radial clearance between the inner body 14 and the outer body 12 may be between 0.125" and 0.250" within the cavity 16 and between 0.001" and 0.002" at the distal end of the outer body 12. However, the subject technology is not limited to clearances within these ranges.

The spindle cartridge 10 further includes an upper cap 18, which is attached to the proximal end of the outer body 12 and the proximal end of the inner body 14. The upper cap 18 may be attached to the outer body 12 using screws 19 and to the inner body 14 using screws 21 or other mechanisms known to those skilled in the art for securing the upper cap 18 to both the outer body 12 and the inner body 14. In this manner, the upper cap 18 limits axial movement of the inner body 14 relative to the outer body 12 and limits radial movement of the proximal end of the inner body 14 relative to the proximal end of the outer body 12. While FIG. 2 depicts at least two screws 19 being arranged adjacent to two screws 21 in the cross-sectional view, this arrangement is for purposes of illustration. The screws 19 may be offset from the screws 21 or aligned with the screws 21 around the upper cap 18. In addition, FIG. 1 depicts six screws 19 and four screws 21. However, the subject technology is not limited to this number for either the screws 19 or the screws 21.

The distal end of the outer body 12 includes a flange configured to be attached to a spindle head of a machine tool. The spindle head of the machine tool may be configured for vertical machining or horizontal machining. The flange of outer body 12 may include multiple holes arranged to align with corresponding holes in the spindle head. Screws or other mechanisms may be used to attach the flange of the outer body 12 to the spindle head. According to one aspect of the subject technology, the outer dimensions of the outer body 12 and the configuration of the flange on the outer body 12 may be similar or identical to a standard spindle cartridge. Such an arrangement allows the dampened spindle cartridge 10 to replace a standard spindle cartridge in a machine tool without having to modify the actuators, linear guides, and/or the machine castings of the machine tool to receive and use the dampened spindle cartridge 10.

The inner body 14 is configured to house a rotating spindle assembly 20. The spindle assembly 20 may include a spindle shaft 22 coaxially arranged within the inner body 14. The proximal end of the spindle shaft 22 extends through an opening in the upper cap 18. A pulley 24 may be mounted on the proximal end of the spindle shaft 22, which allows the spindle shaft 22 to be coupled to a motor in the machine tool for rotating the spindle shaft 22.

The distal end of the spindle shaft 22 extends through an opening in a lower cap 26 attached to the distal end of the inner body 14. The lower cap 26 may be attached to the distal end of the inner body 14 using screws or other mechanisms for securing the lower cap 26 to the inner body 14. The distal end of the spindle shaft 22 is configured to receive and hold a cutting tool. The cutting tool may be held in the distal end of the spindle shaft 22 using a draw bar and a collet or other mechanisms known to those skilled in the art.

As noted above, the spindle shaft 22 may be rotationally driven by the machine tool via the pulley 24 mounted on the proximal end of the spindle shaft 22. As depicted in FIG. 2, the spindle shaft 22 is arranged on bearings 28 within the inner body 14 to allow the spindle shaft 22 to rotate relative to the inner body 14. The bearings 28 may be rolling-element bearings with an outer race attached to the inner body 14 and an inner race attached to the spindle shaft 22. The subject technology is not limited to this type of bearings.

During machining operations, a cutting tool mounted in the spindle assembly 20 may develop tool vibrations due to the rotational speed at which the cutting tool is rotated and/or the feed rate at which the cutting tool is fed into the work piece being machined. If the tool vibrations are left unabated, tool chatter, poor surface finish on the work piece, reduced tool life, and/or objectionable noise may result. The subject technology provides a solution to dampen tool vibrations that may occur during machining operations and isolate tool vibrations from the machine tool structure. By damping tool vibrations, tool life may be improved, better surface finishes on work pieces using higher rates of material removal may be obtained, and objectionable noise may be avoided.

According to one aspect of the subject technology, damping media is arranged in the cavity 16 formed between the inner body 14 and the outer body 12. The damping media may be a solid aggregate material such as steel shot that is placed in the cavity before the upper cap 18 is attached to the inner body 14 and the outer body 12. For example, steel shot placed in cavity 16 may have an average diameter between 0.023 and 0.033 inches. However, the subject technology is not limited to this particular range. Other solid aggregate material such as sand having different sizes may be used in place of the steel shot.

The cavity 16 is substantially filled with the damping media. A light weight oil may be added to the steel shot within the cavity 16 to at least partially coat and prevent corrosion of the steel shot. The remaining space at the opening of the cavity 16 is filled with a retaining ring 30. The retaining ring 30 is formed from a relatively pliant material such as felt that is compressed against the damping media in the cavity 16 by the upper cap 18 when the upper cap 18 is attached to the inner body 14 and the outer body 12 with the screws 19 and 21. In this manner, the retaining ring 30 presses against the damping media to limit movement and shifting of the damping media within the cavity 16. A seal 32 may be arranged between a distal portion of the outer body 12 and the inner body 14 beyond the cavity 16 to prevent leakage of the damping media and/or oil from the cavity 16. For example the seal 32 may be an O-ring arranged between a distal face of the flange of the outer body 12 and a proximal face of the a flange on the distal end of the inner body 14 that extends beyond the outer body 12. Other types of seals and other locations for the seal 32 may be used as well.

As discussed above, the upper cap 18 limits axial movement of the inner body 14 relative to the outer body 12 and radial movement of the proximal end of the inner body 14 relative to the proximal end of the outer body 12. However, a small amount of radial clearance between the distal end of the outer body 12 and the inner body 14 may allow for a small amount of radial movement of the distal end of the inner body 14 relative to the distal end of the outer body 12. For example, the radial clearance may be between 0.001 and 0.002 inches. As the spindle assembly 20 is rotated, tool vibrations are transmitted through the inner body 14 into the damping media. The damping media converts these radial motions of the inner body 14 into friction and heat dissipating the energy of the cutting tool chatter and preventing reinforcement of the tool vibration.

Figure 3:
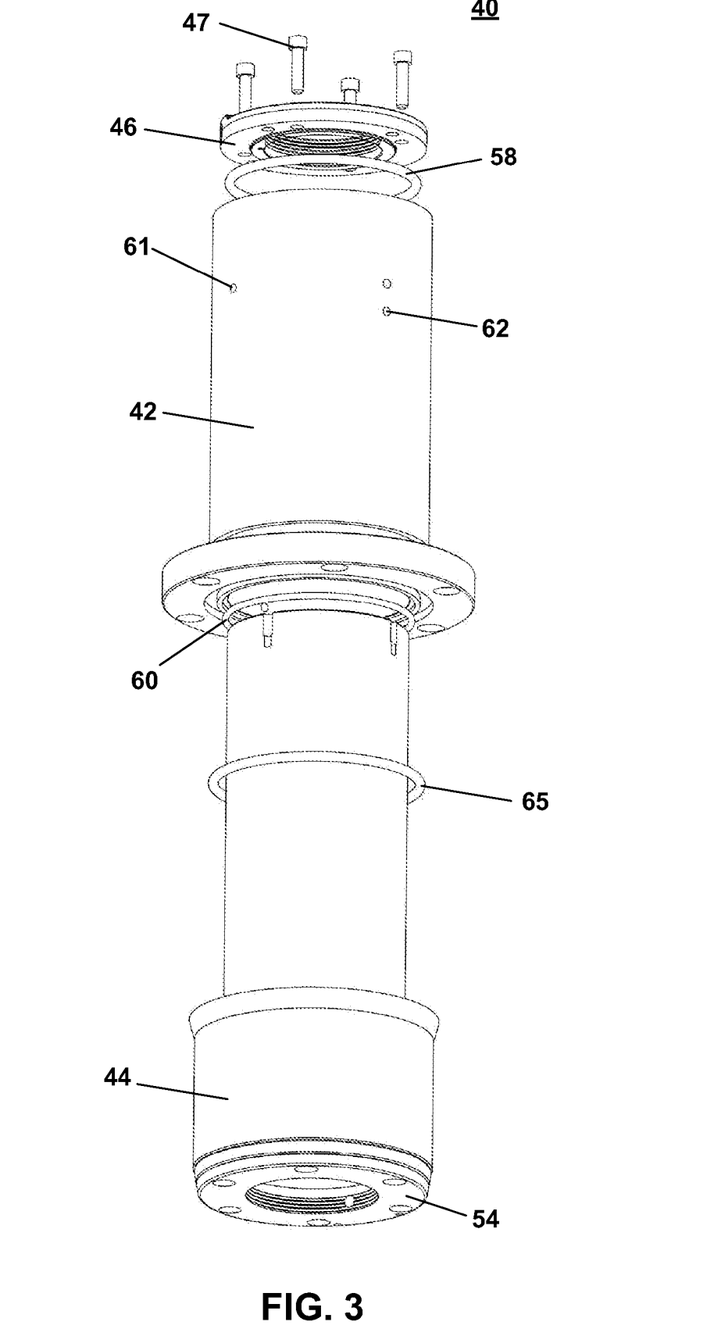
FIG. 3 is a perspective view of components of a partially disassembled dampened spindle cartridge according to one aspect of the subject technology.
Figure 4:
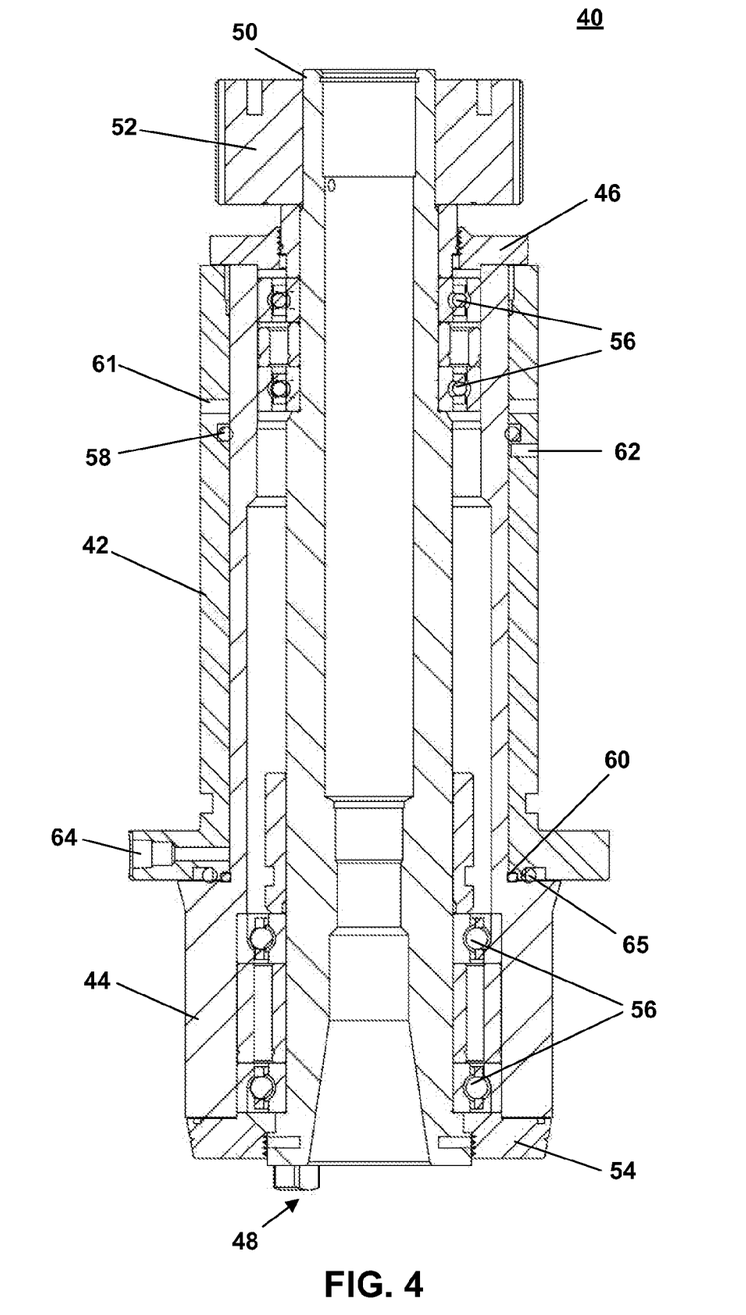
FIG. 4 is a cross-sectional view of a dampened spindle cartridge according to one aspect of the subject technology.

FIG. 3 is a perspective view of components of a partially disassembled dampened spindle cartridge according to one aspect of the subject technology. FIG. 4 is a cross-sectional view of the dampened spindle cartridge according to one aspect of the subject technology. Similar to dampened spindle cartridge 10 described above, the dampened spindle cartridge 40 depicted in FIGS. 3 and 4 includes a cylindrical outer body 42 and a cylindrical inner body 44. The inner body 44 is coaxially arranged within the outer body 42 as shown in FIG. 4. Unlike the spindle cartridge 10, a consistent radial clearance is maintained through the engagement length between the inner body 44 and the outer body 42. For example, the radial clearance between the inner body 44 and the outer body 42 may be between 0.001 and 0.0025 inches through the engagement length. However, the subject technology is not limited to clearances within this range.

The spindle cartridge 40 further includes an upper cap 46, which is attached to the proximal end of the inner body 44 and extends over at least a portion of the proximal end of the outer body 42 without being physically attached to the outer body 42. The upper cap 46 may be attached to the inner body 44 using screws 47 or other mechanisms for securing the upper cap 46 to the inner body 44. While FIG. 3 depicts four screws 47 used to secure the upper cap 46 to the inner body 44, the subject technology is not limited to this number of screws 47. In this manner, the upper cap 46 limits axial movement of the inner body 44 relative to the outer body 42.

The distal end of the outer body 42 includes a flange configured to be attached to a spindle head of a machine tool. The spindle head of the machine tool may be configured for vertical machining or horizontal machining. The flange of the outer body 42 may include multiple holes arranged to align with corresponding holes in the spindle head. Screws or other mechanisms may be used to attach the flange of the outer body 42 to the spindle head. According to one aspect of the subject technology, the outer dimensions of the outer body 42 and the configuration of the flange on the outer body 42 may be similar or identical to a standard spindle cartridge. Such an arrangement allows the dampened spindle cartridge 40 to replace a standard spindle cartridge in a machine tool without having to modify the actuators, linear guides, and/or the machine castings of the machine tool to receive and use the dampened spindle cartridge 40.

The inner body 44 is configured to house a rotating spindle assembly 48. The spindle assembly 48 includes a spindle shaft 50 coaxially arranged within the inner body 44. The proximal end of the spindle shaft 50 extends through an opening in the upper cap 46. A pulley 52 may be mounted on the proximal end of the spindle shaft 50, which allows the spindle shaft 50 to be coupled to a motor in the machine tool for rotating the spindle shaft 50.

The distal end of the spindle shaft 50 extends through an opening in a lower cap 54 attached to the distal end of the inner body 44. The lower cap 54 may be attached to the distal end of the inner body 44 using screws or other mechanisms for securing the lower cap 54 to the inner body 44. The distal end of the spindle shaft 50 is configured to receive and hold a cutting tool. The cutting tool may be held in the distal end of the spindle shaft 50 using a draw bar and a collet or other mechanisms known to those skilled in the art.

As noted above, the spindle shaft 50 may be rotationally driven by the machine tool via the pulley 52 mounted on the proximal end of the spindle shaft 50. As depicted in FIG. 4, the spindle shaft 50 may be arranged on bearings 56 within the inner body 44 to allow the spindle shaft 50 to rotate relative to the inner body 44. The bearings 56 may be rolling-element bearings with an outer race attached to the inner body 44 and an inner race attached to the spindle shaft 50. The subject technology is not limited to this type of bearings.

During machining operations, a cutting tool mounted in the spindle assembly 48 may develop tool vibrations due to the rotational speed at which the cutting tool is rotated and/or the feed rate at which the cutting tool is fed into the work piece being machined. If the tool vibrations are left unabated, tool chatter, poor surface finish on the work piece, reduced tool life, and/or objectionable noise may result. The subject technology provides a solution to dampen tool vibrations that may occur during machining operations and isolate tool vibrations from the machine tool structure. By damping tool vibrations, tool life may be improved, better surface finishes on work pieces using higher rates of material removal may be obtained, and objectionable noise may be avoided.

A first seal 58 is arranged between the inner body 44 and the outer body 42 near the proximal end of the outer body 42 and a second seal 60 is arranged between the inner body 44 and the outer body 42 near the distal end of the outer body 42. The first seal 58 and the second seal 60 may be O-rings. However, other types of seals may be used as well.

According to one aspect of the subject technology an adhesive locking compound may be applied in the radial clearance between the proximal end of the inner body 44 and the proximal end of the outer body 42. For example, the adhesive locking compound may be placed in the radial clearance between the first seal 58 and the proximal ends of the inner body 44 and the outer body 42. The adhesive locking compound may be placed in the radial clearance via ports 61 formed in the outer body 42 in fluid communication with the radial clearance. The ports 61 may be sealed using the adhesive locking compound or may be sealed using a plug or other mechanism known to those skilled in the art. The adhesive locking compound bonds the proximal end of the inner body 44 to the proximal end of the outer body 42 thereby limiting radial movement of the proximal end of the inner body 44 relative to the proximal end of the outer body 42. In addition, the adhesive locking compound limits rotational movement and axial movement of the inner body 44 relative to the outer body 42.

According to one aspect of the subject technology, a damping fluid is used to fill the radial clearance between the inner body 44 and the outer body 42 and is contained within the radial clearance between and by the first seal 58 and the second seal 60. The damping fluid may be a viscous fluid such as heavy gear oil (e.g., Alpha SP 320 gear oil). However, the subject technology is not limited to this type of damping fluid. To fill the radial clearance with the damping fluid, the outer body 42 may include a first port 62 and a second port 64 in fluid communication with the radial clearance between the inner body 44 and the outer body 42 and between the first seal 58 and the second seal 60. According to one aspect of the subject technology, the first port 62 may be arranged near the location of the first seal 58 and the second port 64 may be arranged near the location of the second seal 60. In addition, the first port 62 may be arranged on the opposite side of the outer body 42 from the second port 64, as shown in FIG. 4. A vacuum pump may be coupled to one of the first port 62 and the second port 64 while pressurized damping fluid is pumped into the radial clearance via the other one of the first port 62 and the second port 64. This process is continued until the radial clearance between the first seal 58 and the second seal 60 is completely filled with the damping fluid. Once this filling process has been completed, the first port 62 and the second port 64 may be sealed with plugs such as set screws or may be sealed with other mechanisms known to those skilled in the art to prevent the damping fluid from escaping through either port. This process may be performed after the adhesive locking compound discussed above has been applied and cured.

As discussed above, axial and rotational movement of the inner body 44 is limited relative to the outer body 42 by the upper cap 46 and the adhesive locking compound. The axial movement of the inner body 44 relative to the outer body 42 also is limited by a distal face of the ledge of the outer body 42 abutting a proximal face of a ledge on the distal end of the inner body 44 extending beyond the outer body 42, as shown in FIG. 4. A seal 65 such as an O-ring may be placed between these two surfaces to further seal against leakage of the damping fluid from the radial clearance between the inner body 44 and the outer body 42.

Radial movement of the proximal end of the inner body 44 relative to the proximal end of the outer body 42 is limited by the adhesive locking compound. However, the radial clearance between the distal end of the outer body 42 and the inner body 44 allows for a small amount of radial movement of the distal end of the inner body 44 relative to the distal end of the outer body 42. As the spindle assembly 48 is rotated, tool vibrations are transmitted through the inner body 44 into the damping fluid. The damping fluid attenuates the radial motions of the tool vibrations through squeeze film damping. For example, the film of damping fluid is forced through the radial clearance between the inner body 44 and the outer body 42 but its velocity is restricted by the damping fluid's viscosity and the size of the radial clearance, similar to a hydraulic damper. This damping limits the radial displacement of the distal end of the inner body 44 relative to the distal end of the outer body 42 and reduces the transmission of tool vibration into the spindle head. The damping also prevents the reinforcement of forced vibrations.

Figure 5:
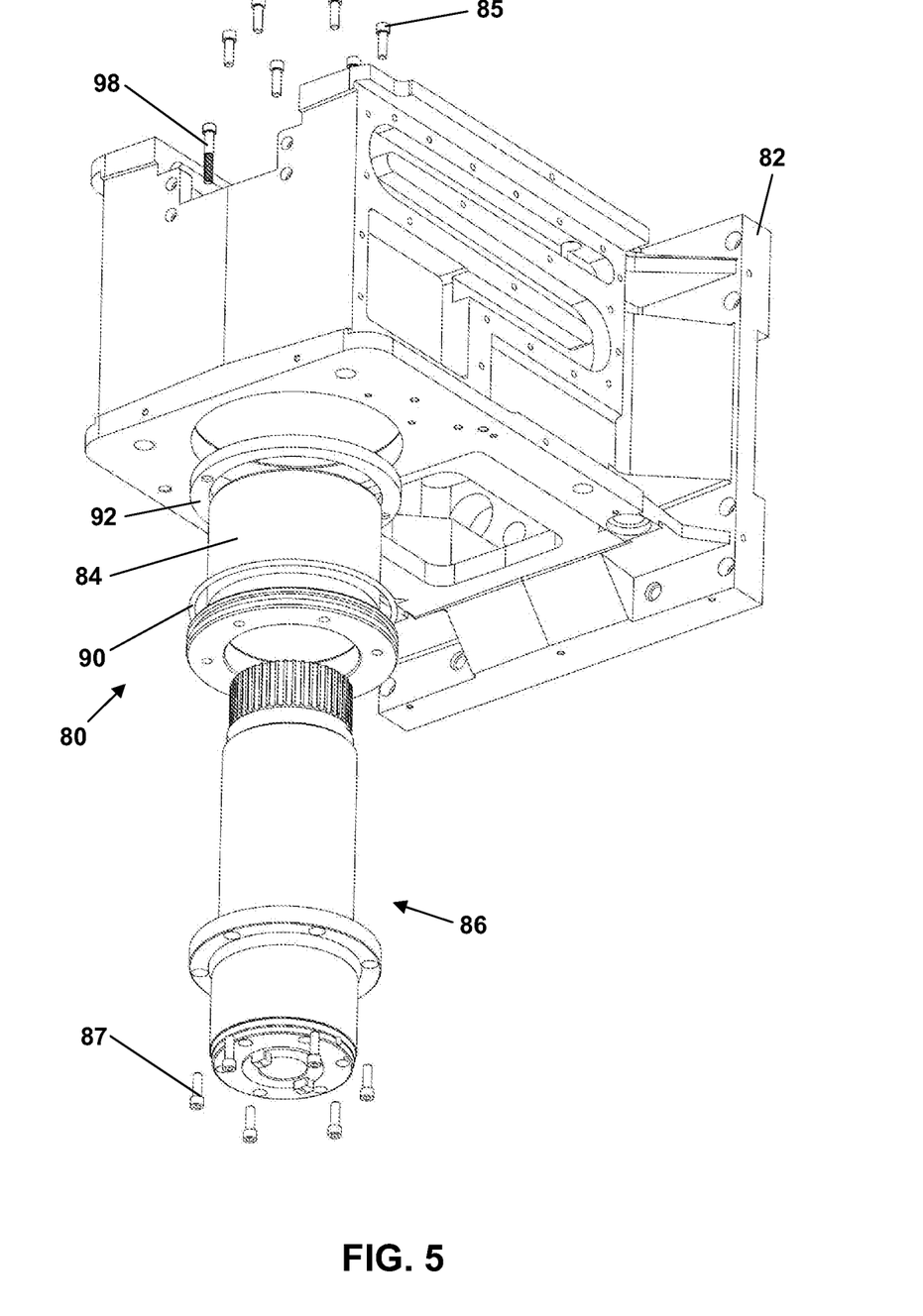
FIG. 5 depicts a perspective view of components of a partially disassembled spindle head and dampened spindle adaptor according to one aspect of the subject technology.
Figure 6:
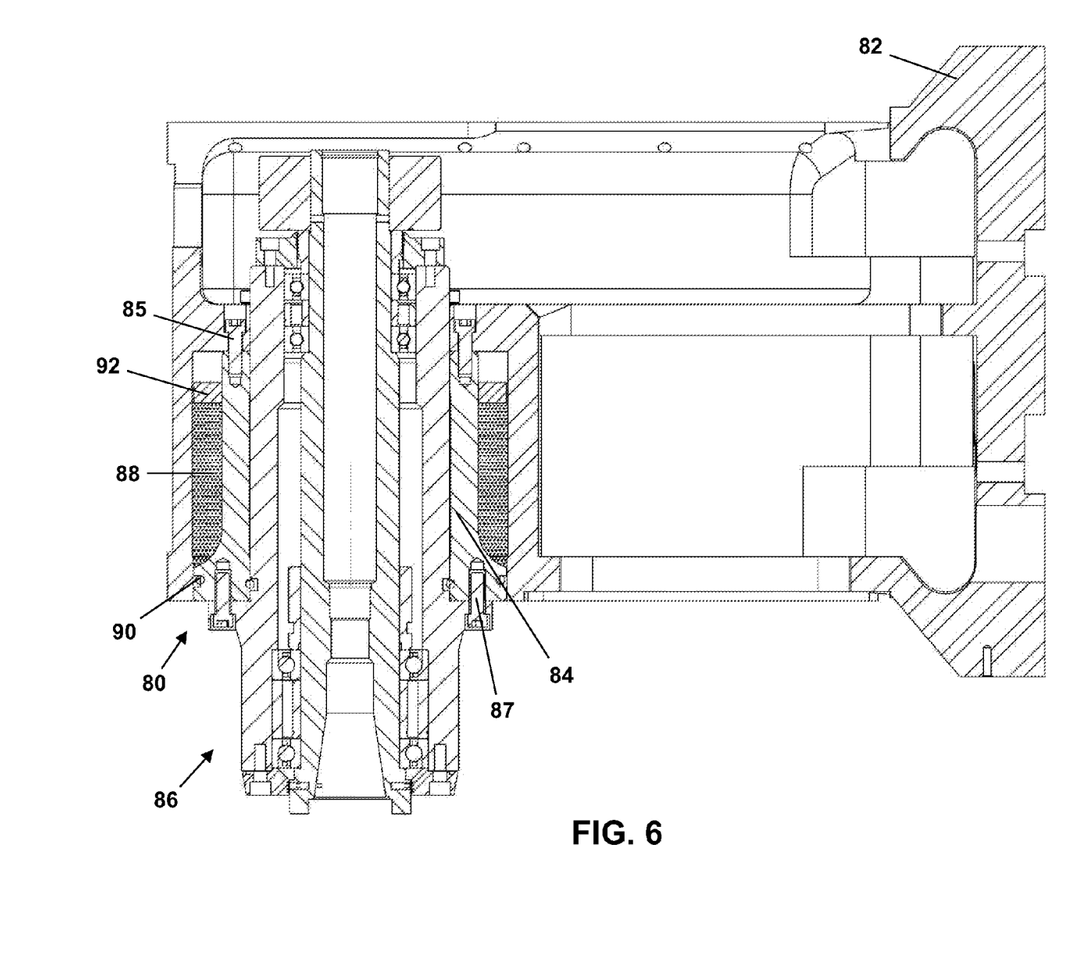
FIG. 6 depicts a side cross-sectional view of the spindle head and dampened spindle adaptor according to one aspect of the subject technology.
Figure 7:
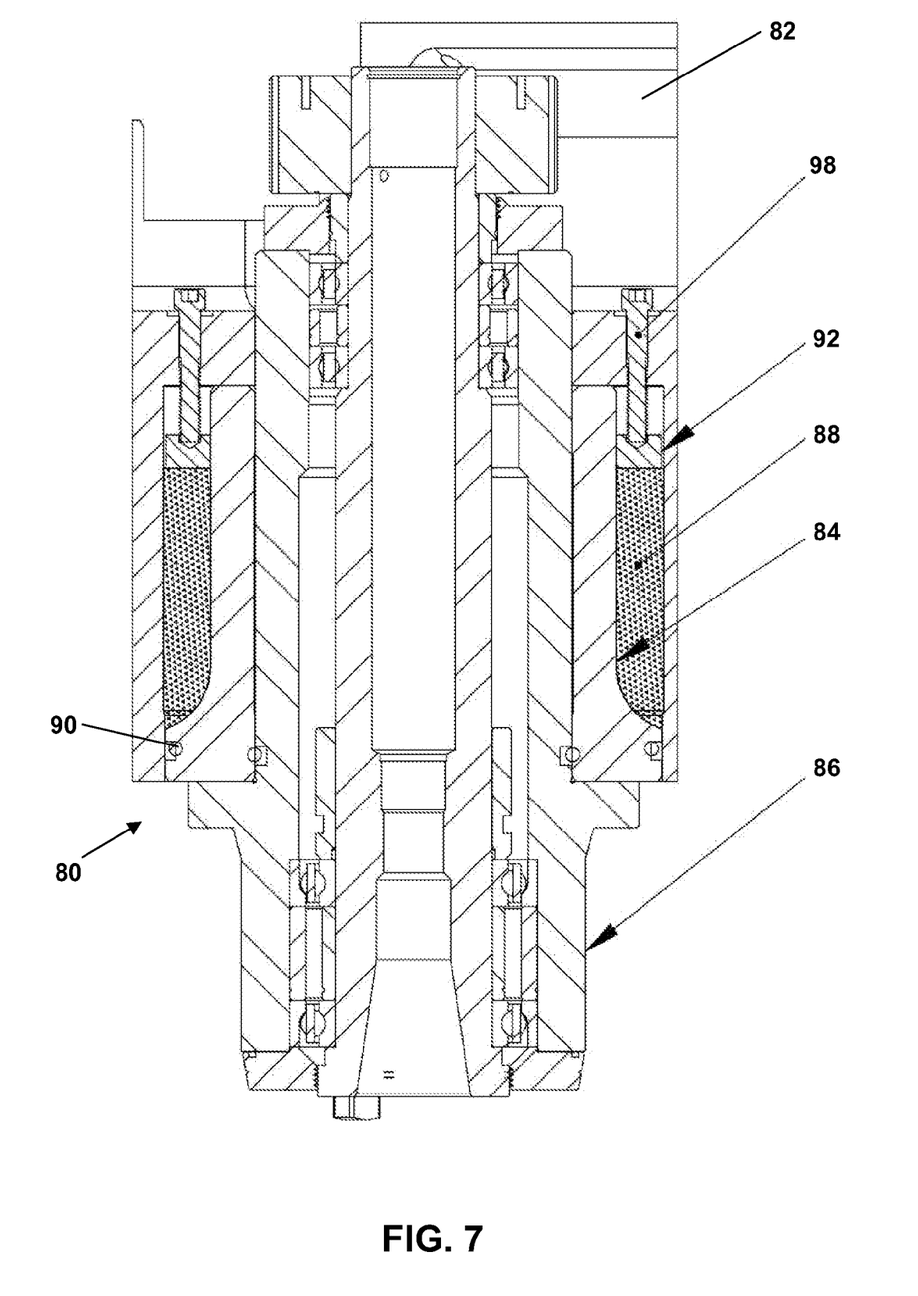
FIG. 7 depicts a front cross-sectional view of the spindle head and dampened spindle adaptor according to one aspect of the subject technology.

FIG. 5 depicts a perspective view of components of a partially disassembled spindle head and dampened spindle adaptor according to one aspect of the subject technology. FIG. 6 depicts a side cross-sectional view of the spindle head and dampened spindle adaptor according to one aspect of the subject technology. FIG. 7 depicts a front cross-sectional view of the spindle head and dampened spindle adaptor according to one aspect of the subject technology. The dampened spindle adaptor 80 is coaxially arranged within a cylindrical bore of the spindle head 82. The spindle adaptor 80 includes an adaptor bushing 84 configured to house a spindle cartridge. The adaptor bushing 84 is configured to be attached to the spindle head 82 at a proximal end of the adaptor bushing 84. For example, a proximal end of the adaptor bushing 84 may be attached to a flange arranged at the proximal end of the cylindrical bore in the spindle head 82 using multiple screws 85 or other mechanisms known to those skilled in the art. While FIG. 5 depicts six screws 85 used to attach the adaptor bushing 84 to the spindle head 82, the subject technology is not limited to this number of screws 85. In this manner, axial movement of the adaptor bushing 84 is limited within the cylindrical bore. Additionally, radial movement of the proximal end of the adaptor bushing 84 is limited with respect to the cylindrical bore.

The adaptor bushing 84 is configured to house a spindle cartridge 86. As depicted in FIGS. 6 and 7, the spindle cartridge 86 is coaxially arranged within the adaptor bushing 84 and is attached to a distal end of the adaptor bushing 84 using multiple screws 87 or other mechanisms known to those skilled in the art. While FIG. 5 depicts six screws 87 for attaching the spindle cartridge 86 to the adaptor bushing 84, the subject technology is not limited to this number of screws 87. During machining operations, a cutting tool mounted in the spindle cartridge 86 may develop tool vibrations due to the rotational speed at which the cutting tool is rotated and/or the feed rate at which the cutting tool is fed into the work piece being machined. If the tool vibrations are left unabated, tool chatter, poor surface finish on the work piece, reduced tool life, and/or objectionable noise may result. The subject technology provides a solution to dampen tool vibrations that may occur during machining operations and isolate tool vibrations from the machine tool structure. By damping tool vibrations, tool life may be improved, better surface finishes on work pieces using higher rates of material removal may be obtained, and objectionable noise may be avoided.

As depicted in FIGS. 6 and 7, a cavity 88 is formed between the adaptor bushing 84 and the wall of the cylindrical bore in the spindle head 82. According to one aspect of the subject technology, damping media is arranged in the cavity 88. The damping media may be a solid aggregate material such as steel shot that is placed in the cavity 88. For example, steel shot placed in cavity 88 may have an average diameter between 0.023 and 0.033 inches. However, the subject technology is not limited to this particular range. Other solid aggregate material such as sand having different sizes may be used in place of the steel shot. A light weight oil may be added to the steel shot within the cavity 88 to at least partially coat and prevent corrosion of the steel shot. A seal 90 may be arranged between a distal portion of the adaptor bushing 84 and the wall of the cylindrical bore in the spindle head 82 to prevent leakage of the damping media and/or oil from the cavity 88. The seal 90 may be an O-ring or another type of seal known to those skilled in the art.

The spindle adaptor 80 also includes a compression plate 92 arranged in the cavity 88. The compression plate 92 is configured with an opening having a diameter that fits the outer diameter of the adaptor bushing 84 and an outer diameter of the compression plate 92 that fits the diameter of the cylindrical bore in the spindle head 82. The compression plate 92 may be a steel plate, but the subject technology is not limited to this material. To fill the cavity 88 with the damping media, one or more fill ports may be formed extending through the compression plate 92. In addition, one or more fill ports may be formed in the flange of the spindle head 82 in alignment with the fill ports in the compression plate 92. Using a funnel or another similar tool, the damping media may be fed through the fill ports in the spindle head 82 and the fill ports in the compression plate 92 into the cavity 88. Once the cavity 88 is filled with the damping media such that the compression plate 92 is near or adjacent to the proximal end of the adaptor bushing 84, plugs such as pipe plugs may be used to seal the one or more fill ports in the compression plate 92, such as the plugs 100 depicted in FIG. 8 as arranged in fill ports of compression plate 92. In addition, plugs such as pipe plugs may be used to seal the one or more fill ports in the spindle head 82. The damping media may be settled in the cavity 88 by vibrating the structure.

Figure 8:
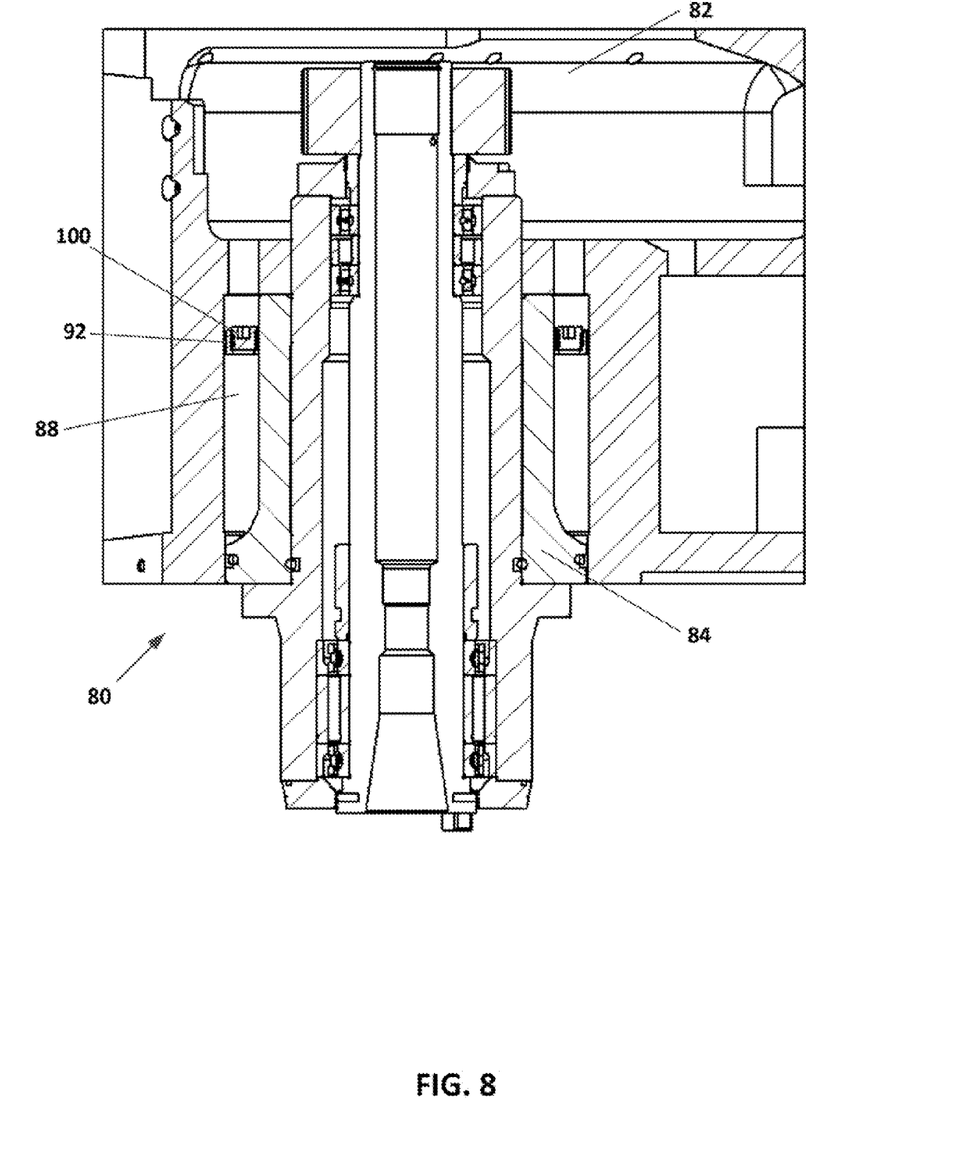
FIG. 8 depicts a front cross-sectional view of the spindle head and dampened spindle adaptor according aspects of the subject technology.

The spindle adaptor 80 further includes multiple jacking screws 98 that are threaded through the flange in the spindle head 82 until the jacking screws 98 come into contact with the compression plate 92 in the cavity 88. The number of jacking screws 98 may be three or more equally spaced around the compression plate 92. The jacking screws are tightened to apply pressure against the damping media in the cavity 88. The pressure applied to the damping media is to cause the damping media to fill the cavity 88 below the compression plate 92 and to limit movement and shifting of the damping media within the cavity 88. However, the pressure applied to the damping media is not so much that the damping media behaves like a rigid body within the cavity 88.

As noted above, the proximal end of the adaptor bushing 84 is attached to the flange of the spindle head 82 to limit axial movement of the proximal end of the adaptor bushing 84 with respect to the cylindrical bore of the spindle head 82. However, a radial clearance between the distal end of the adaptor bushing 84 and the cylindrical bore of the spindle head may allow for a small amount of radial movement of the distal end of the adaptor bushing 84 relative to the distal end of the cylindrical bore of the spindle head 82. For example, the radial clearance may be between 0.001 and 0.002 inches, but the subject technology is not limited to this range. As a cutting tool mounted in the spindle cartridge 86 is rotated, tool vibrations are transmitted through the adaptor bushing 84 into the damping media within cavity 88. The damping media converts these radial motions of the adaptor bushing 84 into friction and heat dissipating the energy of the cutting tool chatter and preventing reinforcement of the tool vibration.

It is understood that any specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A dampened spindle cartridge for a machine tool, comprising:
   an outer body having a flange configured to be attached to a spindle head of the machine tool;
   an inner body configured to house a rotating spindle assembly, wherein the inner body is coaxially arranged within the outer body;
   damping media arranged in a cavity formed between the outer body and the inner body, wherein the damping media comprises an aggregate;
   a retaining ring positioned in an opening of the cavity; and
   a cap attached to a proximal end of the outer body and a proximal end of the inner body to limit radial movement of the proximal end of the inner body relative to the proximal end of the outer body and axial movement of the inner body relative to the outer body,
   wherein the cap covers the opening of the cavity and presses the retaining ring against the damping media to limit movement of the damping media within the cavity.

2. The dampened spindle cartridge according to claim 1, wherein the aggregate comprises steel shot.

3. The dampened spindle cartridge according to claim 2, wherein the steel shot has an average diameter between 0.023 and 0.033 inches.

4. The dampened spindle cartridge according to claim 2, wherein the aggregate further comprises oil coating the steel shot.

5. The dampened spindle cartridge according to claim 1, further comprising a seal arranged between a distal portion of the outer body and the inner body.

6. The dampened spindle cartridge according to claim 5, wherein the seal is arranged between a distal face of the flange of the outer body and a proximal face of a flange of the inner body.

7. The dampened spindle cartridge according to claim 5, wherein the seal comprises an O-ring.

8. The dampened spindle cartridge according to claim 1, wherein the retaining ring comprises felt.

9. The dampened spindle cartridge according to claim 1, wherein the radial clearance between the inner body and the outer body forming the cavity is between 0.125 and 0.250 inches.

10. A dampened spindle cartridge for a machine tool, comprising:
    an outer body having a flange configured to be attached to a spindle head of the machine tool;
    an inner body configured to house a rotating spindle assembly, wherein the inner body is coaxially arranged within the outer body;
    a first seal arranged between the outer body and the inner body;
    a second seal arranged between the outer body and the inner body;
    damping fluid filling a clearance between the inner body and the outer body and between the first seal and the second seal; and
    a cap covering a proximal end of the outer body and attached to a proximal end of the inner body to limit axial movement of the outer body relative to the inner body.

11. The dampened spindle cartridge according to claim 10, further comprising an adhesive locking compound in the clearance between the inner body and the outer body and between the first seal and the proximal ends of the inner body and the outer body to limit radial motion of the proximal end of the inner body relative to the proximal end of the outer body.

12. The dampened spindle cartridge according to claim 10, wherein the first seal comprises a first O-ring and the second seal comprises a second O-ring.

13. The dampened spindle cartridge according to claim 10, wherein the outer body comprises:
 a first port in fluid communication with the clearance between the outer body and the inner body; and
 a second port in fluid communication with the clearance between the outer body and the inner body,
 wherein one of the first port and the second port is configured to be coupled to a vacuum source and the other of the first port and the second port is configured to be coupled to a fluid source for filling the clearance between the inner body and the outer body and between the first seal and the second seal with the damping fluid.

14. The dampened spindle cartridge according to claim 13, further comprising:
 a first plug configured to seal the first port; and
 a second plug configured to seal the second port.

15. The dampened spindle cartridge according to claim 10, wherein the damping fluid comprises a viscous fluid.

16. The dampened spindle cartridge according to claim 10, wherein the damping fluid comprises oil.

17. The dampened spindle cartridge according to claim 10, wherein the clearance between the inner body and the outer body is between 0.001 and 0.0025 inches.

18. A dampened spindle adaptor, comprising:
 an adaptor bushing arranged within a bore of a spindle head and attached to the spindle head at a proximal end of the adaptor bushing, wherein the adaptor bushing is configured to house a spindle cartridge;
 damping media arranged in a cavity formed between the adaptor bushing and the spindle head, wherein the damping media comprises an aggregate; and
 a compression plate arranged in the cavity and configured to apply pressure on the damping media in the cavity.

19. The dampened spindle adaptor according to claim 18, wherein the aggregate comprises steel shot.

20. The dampened spindle adaptor according to claim 19, wherein the steel shot has an average diameter between 0.023 and 0.033 inches.

21. The dampened spindle adaptor according to claim 19, wherein the aggregate further comprises oil coating the steel shot.

22. The dampened spindle adaptor according to claim 18, further comprising a seal arranged between a distal portion of the adaptor bushing and the spindle head.

23. The dampened spindle adaptor according to claim 22, wherein the seal comprises an O-ring.

24. The dampened spindle adaptor according to claim 18, wherein the compression plate comprises a plurality of jacking screws threaded through the spindle head and in contact with an upper surface of the compression plate.

25. The dampened spindle adaptor according to claim 18, wherein the spindle head comprises a plurality of fill ports in fluid communication with the cavity formed between the adaptor bushing and the spindle head,
 wherein the compression plate comprises a plurality of fill ports extending from an upper surface of the compression plate to a lower surface of the compression plate, and
 wherein the plurality of fill ports in the spindle head and the plurality of fill ports in the compression plate are arranged to allow the cavity to be filled with the damping media.

26. The dampened spindle adaptor according to claim 25, further comprising a plurality of plugs configured to seal the plurality of fill ports in the compression plate.

* * * * *